(12) United States Patent
Hirano (10) Patent No.: US 11,682,426 B2
(45) Date of Patent: Jun. 20, 2023

(54) ARCHIVAL DATA STORAGE LIBRARY

(71) Applicant: Western Digital Technologies, Inc., San Jose, CA (US)

(72) Inventor: Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/402,370

(22) Filed: Aug. 13, 2021

(65) Prior Publication Data

US 2023/0048789 A1    Feb. 16, 2023

(51) Int. Cl.
| | |
|---|---|
| *G11B 17/043* | (2006.01) |
| *G11B 17/044* | (2006.01) |
| *G11B 17/03* | (2006.01) |
| *G11B 33/12* | (2006.01) |
| *G11B 33/14* | (2006.01) |
| *G11B 17/04* | (2006.01) |

(52) U.S. Cl.
CPC ............ *G11B 17/043* (2013.01); *G11B 17/03* (2013.01); *G11B 17/044* (2013.01); *G11B 17/0405* (2013.01); *G11B 33/125* (2013.01); *G11B 33/14* (2013.01)

(58) Field of Classification Search
CPC ..... G11B 17/022; G11B 17/028; G11B 33/14; G11B 17/043; G11B 17/03; G11B 17/0405; G11B 17/044
See application file for complete search history.

(56) References Cited

U.S. PATENT DOCUMENTS

| | | | |
|---|---|---|---|
| 3,359,549 A | * | 12/1967 | Farrand .................. G11B 5/825 360/98.02 |
| 4,008,492 A | | 2/1977 | Elsing |
| 4,396,964 A | | 8/1983 | Morehouse et al. |

(Continued)

FOREIGN PATENT DOCUMENTS

NL    7908338 A    6/1981

OTHER PUBLICATIONS

Sony Electronics Inc., Meet the family, 2 pages, downloaded from https://pro.sony/ue_US/products/optical-disc, as early as Aug. 5, 2021.

(Continued)

*Primary Examiner* — Brian E Miller
(74) *Attorney, Agent, or Firm* — John D. Henkhaus (57) ABSTRACT

An archival data storage system library includes magnetic-recording disk media, a storage enclosure in which the media are housed, data storage devices (DSDs) configured to write to and read from the media, an automated disk handling mechanism configured to transfer at least some of the media between the storage enclosure and the DSD, and a hermetic enclosure containing the foregoing components. The storage system may further include a gas circulation system for filtering contaminants from the hermetic enclosure. Such a storage system may be implemented as a rack-mountable unit, or as an entire cleanroom facility, as well as in intermediate form factors between those. In the context of a cleanroom storage system, the system may further include an automated disk handling shuttle to receive the media from the disk handling mechanism and an automated disk loading mechanism for accessing the media from the shuttle for installing into the DSD.

20 Claims, 8 Drawing Sheets

(56) References Cited

U.S. PATENT DOCUMENTS

| | | | |
|---|---|---|---|
| 4,412,261 A | 10/1983 | Tateyama et al. | |
| 5,548,521 A * | 8/1996 | Krayer | G06K 17/0012 |
| | | | 700/214 |
| 5,893,699 A * | 4/1999 | Dadiomov | B25J 15/0019 |
| | | | 414/815 |
| 6,027,296 A * | 2/2000 | Meier | G11B 15/6751 |
| | | | 360/92.1 |
| 6,301,204 B1 * | 10/2001 | Yamada | G11B 17/225 |
| | | | 369/34.01 |
| 6,671,575 B2 * | 12/2003 | Baik | G11B 33/0444 |
| | | | 700/214 |
| 7,383,560 B2 * | 6/2008 | Edwards | G11B 23/0323 |
| | | | 720/728 |
| 7,469,571 B2 * | 12/2008 | Taguchi | G11B 33/08 |
| | | | 73/11.04 |
| 8,041,449 B2 | 10/2011 | Noble et al. | |
| 8,958,173 B1 * | 2/2015 | Hirano | G11B 5/5569 |
| | | | 360/98.01 |
| 9,063,542 B2 * | 6/2015 | Greco | H04L 9/0822 |
| 9,601,149 B1 * | 3/2017 | Todd | G11B 17/225 |
| 9,607,662 B1 * | 3/2017 | Adrian | G11B 33/142 |
| 9,715,894 B2 * | 7/2017 | Ostwald | G11B 15/6835 |
| 10,600,441 B1 * | 3/2020 | Altknecht | G11B 17/225 |
| 10,770,108 B2 * | 9/2020 | Goto | G11B 23/0323 |
| 11,443,775 B1 * | 9/2022 | Herdendorf | G11B 23/0323 |
| 2002/0055804 A1 * | 5/2002 | Betawar | G05B 19/41865 |
| | | | 700/121 |
| 2002/0159182 A1 * | 10/2002 | Albrecht | G11B 25/043 |
| 2003/0161070 A1 | 8/2003 | Bonin | |
| 2004/0049313 A1 | 3/2004 | Deckers | |
| 2004/0090880 A1 * | 5/2004 | Katao | G11B 33/1446 |
| 2006/0146658 A1 | 7/2006 | Russ | |
| 2007/0183084 A1 * | 8/2007 | Coufal | G11B 15/6835 |
| | | | 360/92.1 |
| 2007/0201164 A1 * | 8/2007 | Bauck | G11B 17/225 |
| 2007/0253109 A1 * | 11/2007 | Soeken | G11B 15/6835 |
| 2009/0297328 A1 * | 12/2009 | Slocum, III | B25J 9/0093 |
| | | | 414/222.09 |
| 2010/0241271 A1 * | 9/2010 | Shimizu | H01L 21/67766 |
| | | | 700/218 |
| 2010/0287576 A1 * | 11/2010 | Terzis | G11B 17/225 |
| 2011/0064546 A1 * | 3/2011 | Merrow | G11B 33/128 |
| | | | 414/676 |
| 2011/0236163 A1 | 9/2011 | Smith et al. | |
| 2014/0193226 A1 | 7/2014 | Hashimoto | |
| 2014/0271064 A1 | 9/2014 | Merrow et al. | |
| 2017/0018287 A1 * | 1/2017 | Adrian | G11B 15/6835 |
| 2017/0084304 A1 * | 3/2017 | Fiebrich-Kandler | |
| | | | G11B 17/225 |
| 2017/0181306 A1 * | 6/2017 | Shaw | H05K 7/1438 |
| 2018/0211691 A1 * | 7/2018 | Altknecht | G11B 17/08 |
| 2020/0119314 A1 * | 4/2020 | Pun | B05B 13/0473 |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.
Korean Intellectual Property Office (ISA/KR), PCT International Search Report and Written Opinion for counterpart International application No. PCT/US2022/027549, dated Oct. 21, 2022, 10 pages.
Hirano, Toshiki, Read-Write Device for an Archival Data Storage Library, U.S. Appl. No. 17/405,991, filed Aug. 18, 2021.

* cited by examiner

ARCHIVAL DATA STORAGE LIBRARY

FIELD OF EMBODIMENTS

Embodiments of the invention may relate generally to data storage systems and, more particularly, to an archival data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patter s of positive and negative currents. The current in the coil of the write head produces a localized magnetic field across the gap between the head and the magnetic disk, which in turn magnetizes a small area on the recording medium.

There is an increasing need for archival data storage. Magnetic tape is a traditional solution for data back-up, but is notably slow in accessing the stored data. Current archives are increasingly "active" archives, meaning some level of continuing random read data access is required. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a magnetic disk-based data archival storage library are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

Context

Recall that there is a significant need for archival data storage, and that magnetic disks in hard disk drives (HDDs) have some advantages over other magnetic media in the context of archival (or "cold") data storage. With respect to reducing the overall cost per byte ($/Tb) of magnetic disk-based storage systems, the costs associated with the read-write head, the mechanical structures, and the electronics might be reduced. Also, increasing the number of disks per system is another way in which to further the $/Tb cost reduction goal. However, still in view of the foregoing, a vast magnetic disk "library" containing a significantly large number of magnetic recording disks is considered an ultimate low-cost solution to the challenges associated with archival data storage both now and into the future, and which would demonstrate a faster "time to first byte" than tape (e.g., no tape winding needed) and a faster data rate than with optical disks. With such a magnetic disk library, there are scaling options from small to large. One might choose to implement such an archival data storage library in the form of a rack-mount enclosure, one or more whole racks, an enclosed "shipping container" type library, or as in an enclosed cleanroom environment, for non-limiting examples. Generally, the larger the system the lower the corresponding cost and the more robust the corresponding data recovery would expect to follow.

Magnetic Disk Archival Data Storage Library

Figure 1:
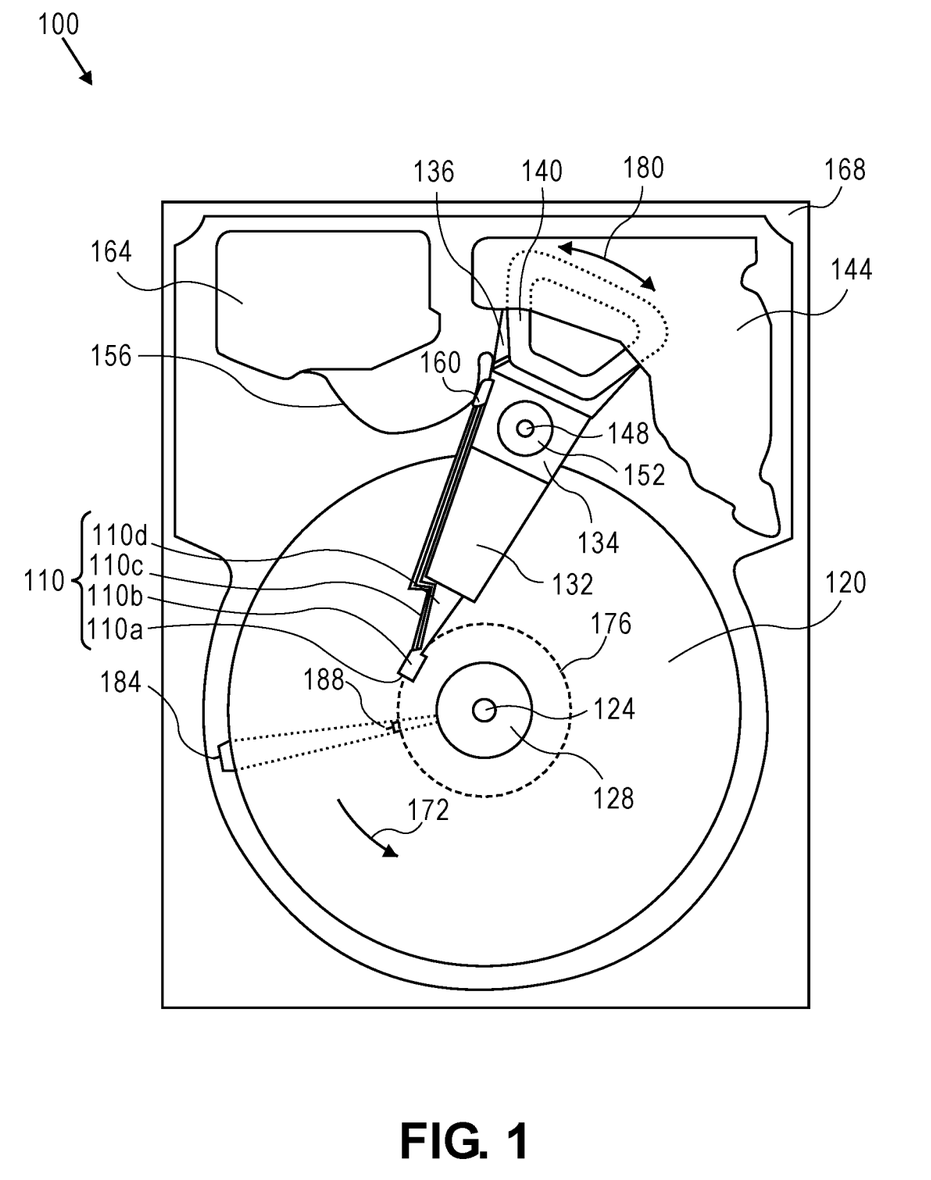
FIG. 1 is a plan view illustrating a hard disk drive (HDD), according to an embodiment.
Figure 2:
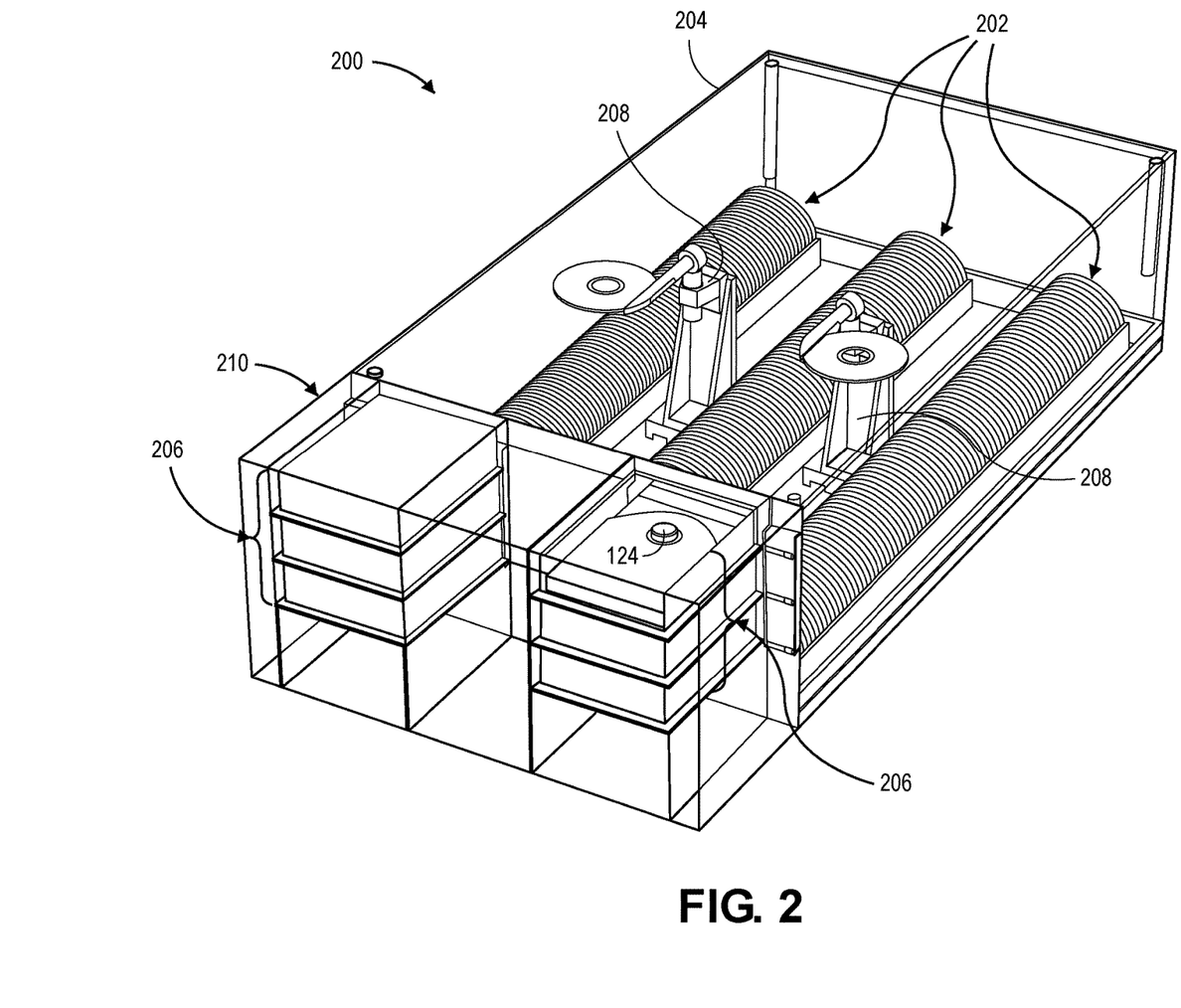
FIG. 2 is a perspective view illustrating an archival data storage system, according to an embodiment.

FIG. 2 is a perspective view illustrating an archival data storage system (or "data storage library"), according to an embodiment. Data storage system 200 (or simply "storage system 200") comprises a plurality of magnetic-recording disk media 202 (or simply "disk media 202"), such as one or more rows of disk media 202 as illustrated, at least one disk storage enclosure 204 in which the disk media 202 are housed, and at least one data storage device (DSD) 206 configured to write to and to read from the disk media 202, where DSD 206 is functionally and operationally the same as or largely similar to the hard disk drive (HDD) 100 of FIG. 1. However, a DSD 206 implemented similarly to HDD 100 may be decomposed or separated into multiple separate sub-assemblies, such as a first sub-assembly comprising the disk spindle 124 (FIG. 1) and associated components on which the disk media 202 are mounted for read-write operations and a second sub-assembly comprising a head-stack assembly (HSA) (FIG. 1) and associated components for reading from and writing to the disk media 202. The sub-assemblies of such a decomposed DSD 206 may be assembled at some distance from each other (such as for disk mounting clearance purposes for a non-limiting example) and configured for operationally engaging or interlocking (e.g., by translating or rotating) when needed for performance of read-write operations. With a data storage system comprising multiple DSDs, each DSD is typically communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which would be under some degree of control by the system controller. Controllers referenced herein may be embodied in any form of and/or combination of software, hardware, and firmware, such as an application-specific integrated circuit (ASIC) comprising at least one memory unit for storing such instructions and at least one processor for executing such instructions.

Storage system 200 further comprises at least one automated disk handling mechanism 208 (e.g. a robotic machine, or robot) configured and programmed to transfer at least some of the disk media 202 between the disk storage enclosure 204 and one or more DSD 206. Some hard disk drive (HDD) manufacturing processes utilize automated disk handling machines (e.g., a "pick and place" robot to load disks onto a spindle), which may be modified or otherwise implemented for use for this purpose, for a non-limiting example. Additionally, storage system 200 comprises a hermetic (or temporarily, or semi-hermetic) enclosure 210 configured for containing the disk media 202, the disk storage enclosure(s) 204, the at least one DSD 206, and the at least one disk handling mechanism 208. Thus, the hermetic enclosure 210 of this version of the storage system 200 depicted in FIG. 2 is referred to as a rack-mountable enclosure, whereby the storage system 200 can be employed in a conventional or non-conventional electronics equipment rack. Here, with storage system 200, a corresponding system controller may be further configured and programmed to communicate with and to manage and control the automated machinery, e.g., the disk handling mechanism 208, to the extent that control is not integrated directly into the automated machinery.

Because modern HDDs fly the read-write head so very close to the disk surface, the presence of surface contaminants attached to either the head slider and/or the disk can cause undesirable flying height changes which increases the likelihood of head-disk contact (or "crash") and thus read-write (I/O) errors. Conventional HDDs operate in a "clean" environment, i.e., a sealed operating environment relatively free of contaminant particles, outgases, and the like, which is typically maintained after manufacturing by utilizing one or more internal filters. Breather and/or other HDD filters often are designed and configured to serve multiple functions, such as absorbing contaminants, adsorbing contaminants, controlling humidity, and the like. Because, with an HDD implemented for use as a DSD 206, the disk media 202 need to be loaded onto and unloaded from a disk spindle 124 during operation of the storage system 200, in contrast with a conventional HDD the DSD 206 is unsealed or "open" (although it may be implemented with, for example, a DSD enclosure comprising a movable and/or removable cover with an opening/closing mechanism and a gasket seal for temporary sealing purposes when closed). Hence, according to an embodiment, the DSD 206 and the disk media 202 are both enclosed in the larger hermetic enclosure 210 to provide some degree of sealing for contaminant control and management purposes. According to an embodiment, storage system 200 further comprises an air/gas circulation system (see, e.g., circulation system 312 of FIG. 3B) configured to continuously filter and/or remove contaminants from the internal environment of the hermetic enclosure 210, such as by use of a circulation fan(s) and a filter(s) (e.g., a HEPA (high-efficiency particulate air) filter) for a non-limiting example.

Implementing an archival data storage system or library such as storage system 200 into different larger form factors is specifically contemplated, such as implementation in systems in enclosures configured as illustrated in reference to FIGS. 3, 5A-5C.

Archival Data Storage Library in a Cleanroom Environment

Figure 3A:
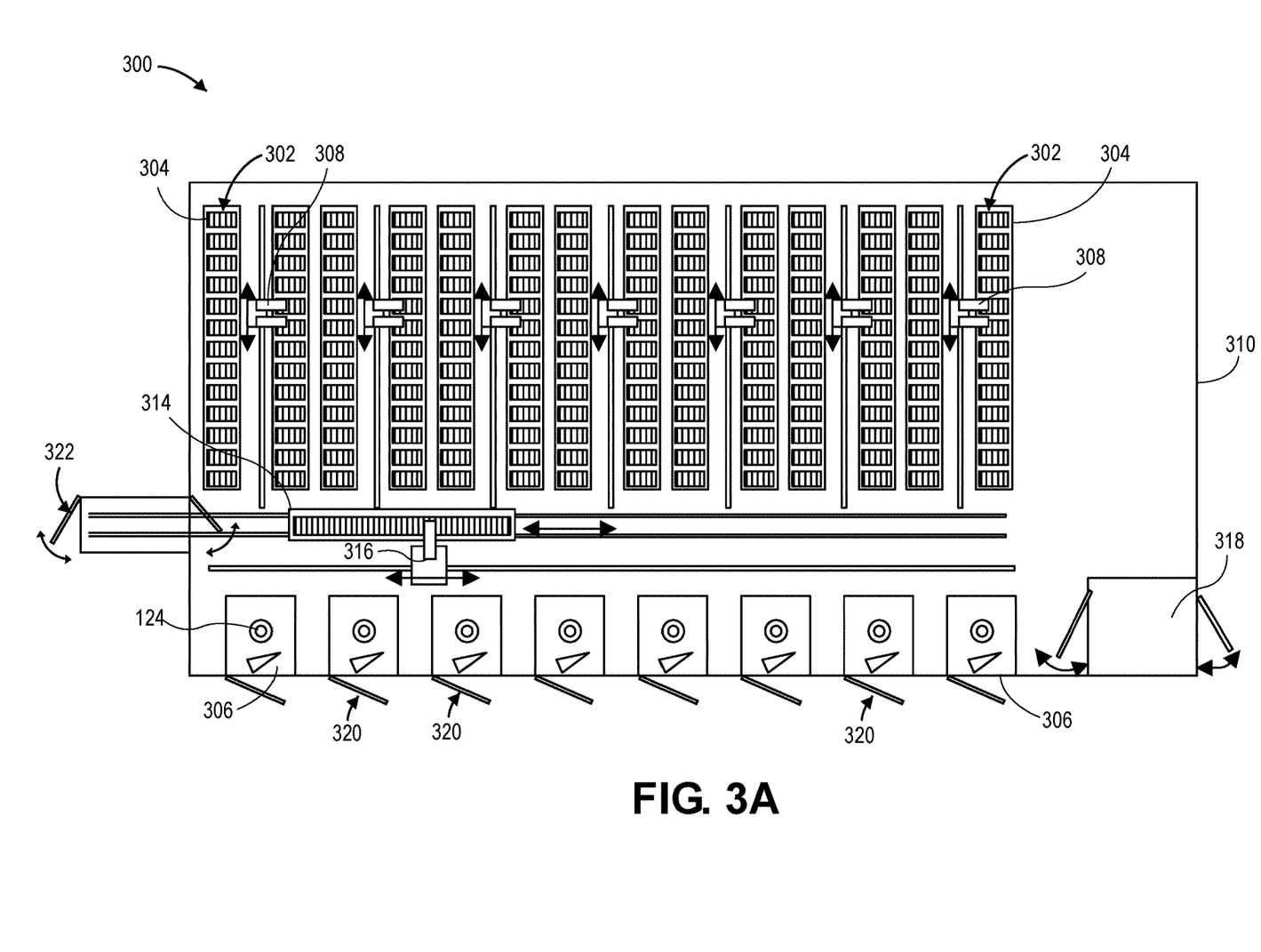
FIG. 3A is a top view illustrating an archival data storage system, according to an embodiment.
Figure 3B:
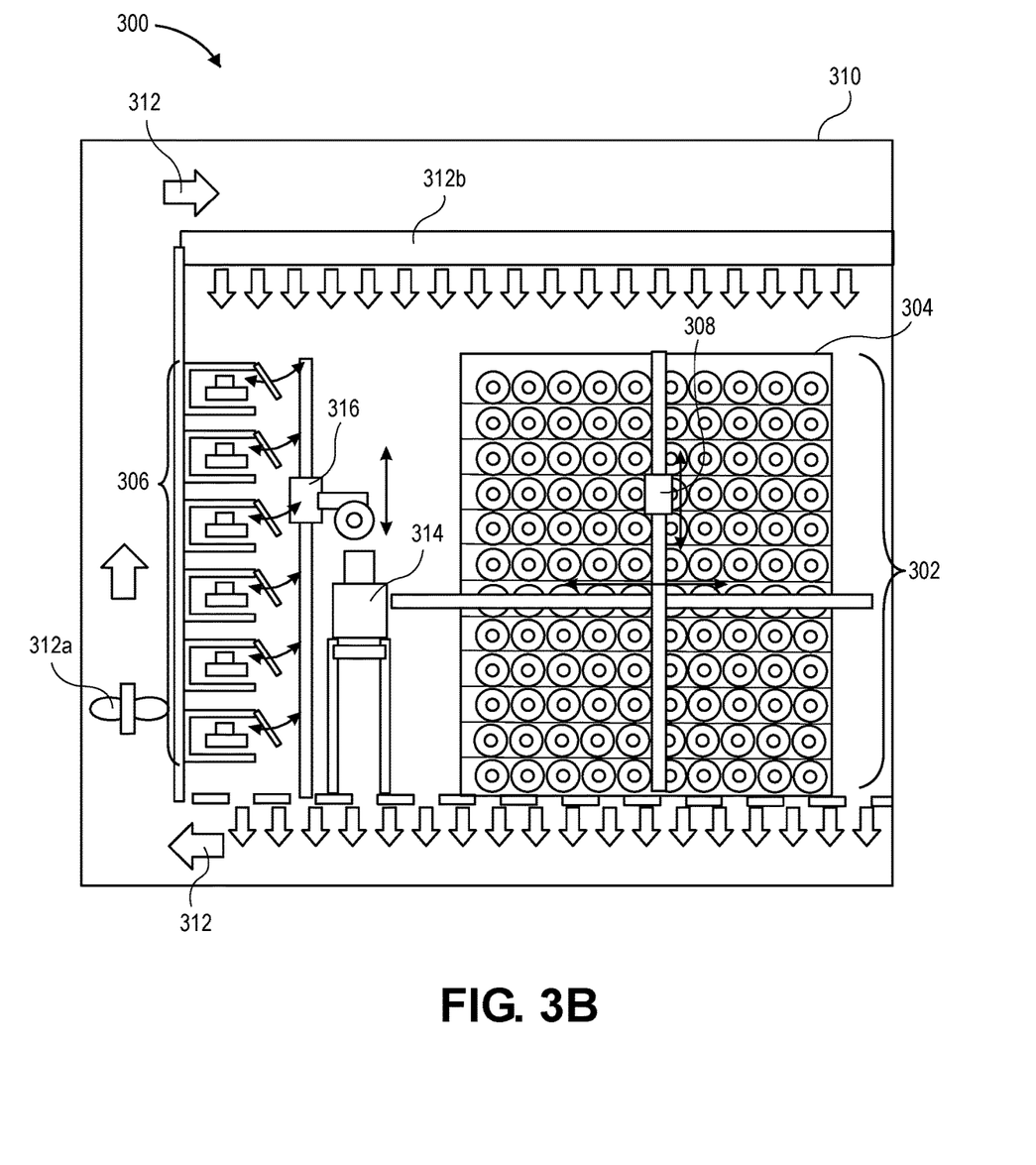
FIG. 3B is a side view illustrating the archival data storage system of FIG. 3A, according to an embodiment.

FIG. 3A is a top view illustrating an archival data storage system, and FIG. 3B is a side view illustrating the archival data storage system of FIG. 3A, according to an embodiment. Data storage system 300 (or simply "storage system 300") comprises a plurality of magnetic-recording disk media 302 (or simply "disk media 302"), a plurality of disk storage enclosures 304 in which the disk media 302 are housed, and a plurality of data storage devices (DSD) 306 configured to write to and to read from the disk media 302 (not all similar units are labeled here, for purposes of illustrative simplicity and clarity), where DSD 306 is functionally and operationally the same as or similar to the hard disk drive (HDD) 100 of FIG. 1. According to an embodiment and as depicted, the disk media 302 includes multiple rows of one or more racks and/or shelves of disk media 302, where the disk storage enclosures 304 include the racks of shelves housing and storing the disk media 302. Furthermore, the DSDs 306 include an array or matrix of DSDs (e.g., a rectangular arrangement of units) as depicted in FIG. 3B and according to an embodiment. As with DSD 206 (FIG. 2), DSD 306 may be decomposed or separated into multiple separate sub-assemblies configured for operationally engaging or interlocking when needed for performance of read-write operations. As described in reference to storage system 200 (FIG. 2), each DSD is typically communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which would be under some degree of control by the system controller.

Storage system 300 further comprises at least one automated disk handling mechanism 308 (e.g. a translatable robotic machine, such as a "pick and place" robot) configured and programmed to transfer disk media 302 between a disk storage enclosure 304 in a disk storage area and ultimately to one or more of the DSDs 306. Again, automated disk handling machines used in HDD manufacturing may be modified or otherwise implemented for use for this purpose, such as by mounting on a translating mechanism(s) (e.g., a cart on a track(s)) for automated movement along a rack or a row of racks and up and down the shelves of a rack for access to individual disk media 302 (or containers, cassettes, cartridges of disk media 302), for a non-limiting example. According to an embodiment, disk storage enclosure 304 comprises a container comprising a lid or cover configured to open (e.g., for disk media 302 access) and to close (e.g., for safe storage of the disk media 302 and for transporting the disk media 302 to and from the storage system 300), and disk handling mechanism 308 (and/or a disk loading mechanism 316) is configured to open and close the lid of the container for access to the individual disk media 302 stored therein. Thus, the disk media 302 are protected from external contamination during storage, handling of disk media 302 is easier than with individual disks, and the container with disk media 302 inside can be removed from the storage system (e.g., from a hermetic enclosure 310) for transportation if necessary. Furthermore, multiple disk storage containers can therefore be stored on each shelf of each of a plurality of racks, and the disk handling mechanism 308 may be configured to operate to handle a container of disk media 302 rather than or in addition to individual disk media 302.

Additionally, storage system 300 comprises a hermetic enclosure 310 configured for containing the disk media 302, the disk storage enclosures 304, the DSDs 306, and the disk handling mechanisms 308. Thus, the hermetic enclosure 310 of this version of a storage system (storage system 300) depicted in FIGS. 3A-3B is referred to as a cleanroom. As generally well-understood, cleanrooms are designed to maintain extremely low levels of particulates such as dust, airborne organisms, vaporized particles, and the like, and typically rely on a constant, highly-filtered air flow to entrap and/or flush out contaminants and impurities. Again, with an HDD implemented for use as a DSD 306, the disk media 302 need to be loaded onto and unloaded from a disk spindle 124 during operation. Therefore, the DSD 306 is unsealed or "open" (although it may be implemented with, for example, a DSD enclosure comprising a movable and/or removable cover with an opening/closing mechanism and a gasket seal for temporary sealing purposes when closed). According to an embodiment, all the data storage components of the storage system 300 (disk media 302, disk storage enclosures 304, DSDs 306, disk handling mechanisms 308) are enclosed in the larger hermetic enclosure 310, i.e., the cleanroom, to provide contaminant control.

According to an embodiment, storage system 300 further comprises an air/gas circulation system 312 (generally depicted with block arrows in FIG. 3B) configured to continuously filter and/or remove contaminants from the internal environment of the hermetic enclosure 310. According to an embodiment, circulation system 312 comprises one or more circulation fan(s) 312a for blowing air down from the ceiling through one or more filter(s) 312b (for non-limiting examples, a HEPA (high-efficiency particulate air) filter and/or a ULPA (ultra-low penetration air) filter). Typically, this type of cleanroom circulation system 312 further comprises floor panels having many holes through which the air is exhausted to the space below and circulated back to the ceiling filters 312b in a closed loop. Furthermore and according to an embodiment, storage system 300 (and the storage system 200 of FIG. 2) further comprises one or more access means for access to the inside of the hermetic enclosure 310 (or the hermetic enclosure 210 of FIG. 2).

According to a related embodiment in which the hermetic enclosure 310 is implemented as a cleanroom, the access means are configured for personnel to enter and exit the hermetic enclosure 310. For example, the cleanroom may be provisioned with an intermediate room 318 having a double-door and an air shower for inhibiting the introduction of external particulates into the hermetic enclosure 310. As such, a person (e.g., maintenance personnel) entering the hermetic enclosure 310 (e.g., in a clean suit, commonly and colloquially referred to as a "bunny suit") first enters the intermediate room 318, where particulates are removed from the person via the air shower after the external door is closed, and then proceeds to enter the hermetic enclosure 310 once the air shower shuts off and the internal door is opened.

According to an embodiment, storage system 300 further comprises an automated disk handling shuttle 314 (e.g. a translatable robotic machine) configured to receive disk media 302 (or containers of disk media 302, as described elsewhere herein) from the disk handling mechanisms 308, and an automated disk loading mechanism 316 (e.g. a translatable robotic machine, such as a "pick and place" robot) configured to access the disk media 302 from the disk handling shuttle 314 and to install or mount the disk media 302 into/onto the disk spindle 124 of the DSDs 306, and which may be further configured to open and close a container of disk media 302 and a DSD 306 cover. According to an embodiment, each disk handling mechanism 308 is configured to move between rows of disk storage enclosures 304, where the disk storage enclosures 304 may comprise racks of shelves housing and storing the disk media 302, and where the automated disk handling shuttle 314 is configured to move across the rows to receive disk media 302 from disk handling mechanism(s) 308. Further, the automated disk loading mechanism 316 is configured to access the disk media 302 from the disk handling shuttle 314 and to install the disk media 302 into/onto one of the DSDs 306. Thus, a single disk handling shuttle 314 may be implemented to move across the rows of disk storage enclosures 304 to receive disk media 302 from multiple disk handling mechanisms 308 (such as a single disk handling mechanisms 308 per row, for a non-limiting example). With storage system 300, a corresponding system controller may be further configured and programmed to communicate with and to manage and control the automated machinery (e.g., disk handling mechanisms 308, disk handling shuttle 314, and/or disk loading mechanism 316), to the extent that control is not integrated directly into the automated machinery.

In an implementation in which the hermetic enclosure 310 is implemented as a cleanroom, according to an embodiment the storage system 300 further comprises at least one first service door 320 positioned adjacent to (e.g., behind) and configured for use in replacing one or more DSD 306. Thus, failed DSDs 306 can be replaced without entering the hermetic enclosure 310, e.g., the cleanroom. Furthermore and according to an embodiment, the storage system 300 further comprises at least one second service door 322 configured for use in adding or removing disk media 302 from the hermetic enclosure 310 of storage system 300. This second service door 322 may be implemented similarly to a double door as conventionally used for entering and exiting a cleanroom, and is preferably located at one end of the disk handling shuttle 314 path/track.

Figure 5A:
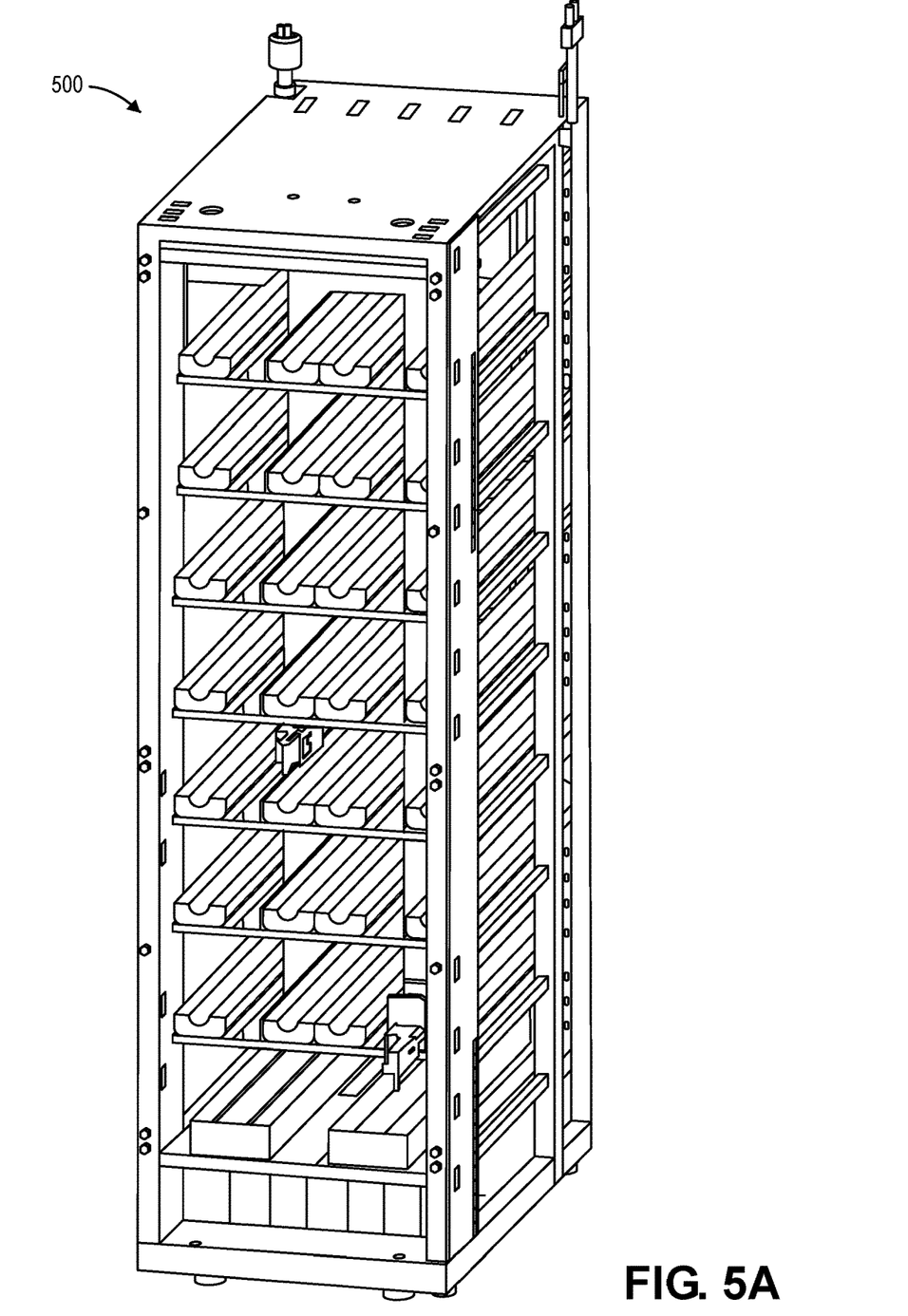
FIG. 5A is a perspective view illustrating an archival data storage system embodied as an equipment rack, according to an embodiment.
Figure 5B:
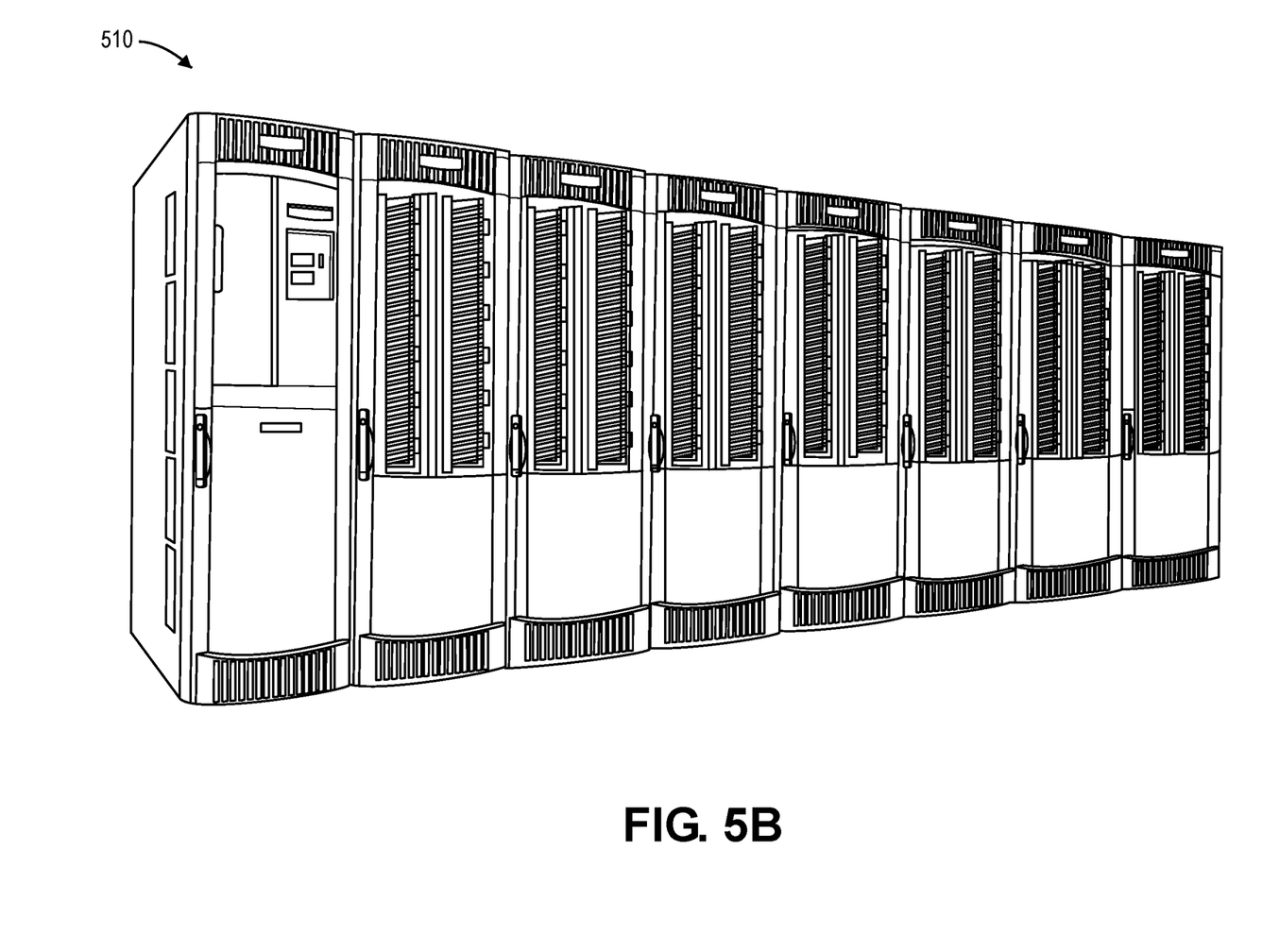
FIG. 5B is a perspective view illustrating an archival data storage system embodied as a group of operationally-integrated equipment racks, according to an embodiment.
Figure 5C:
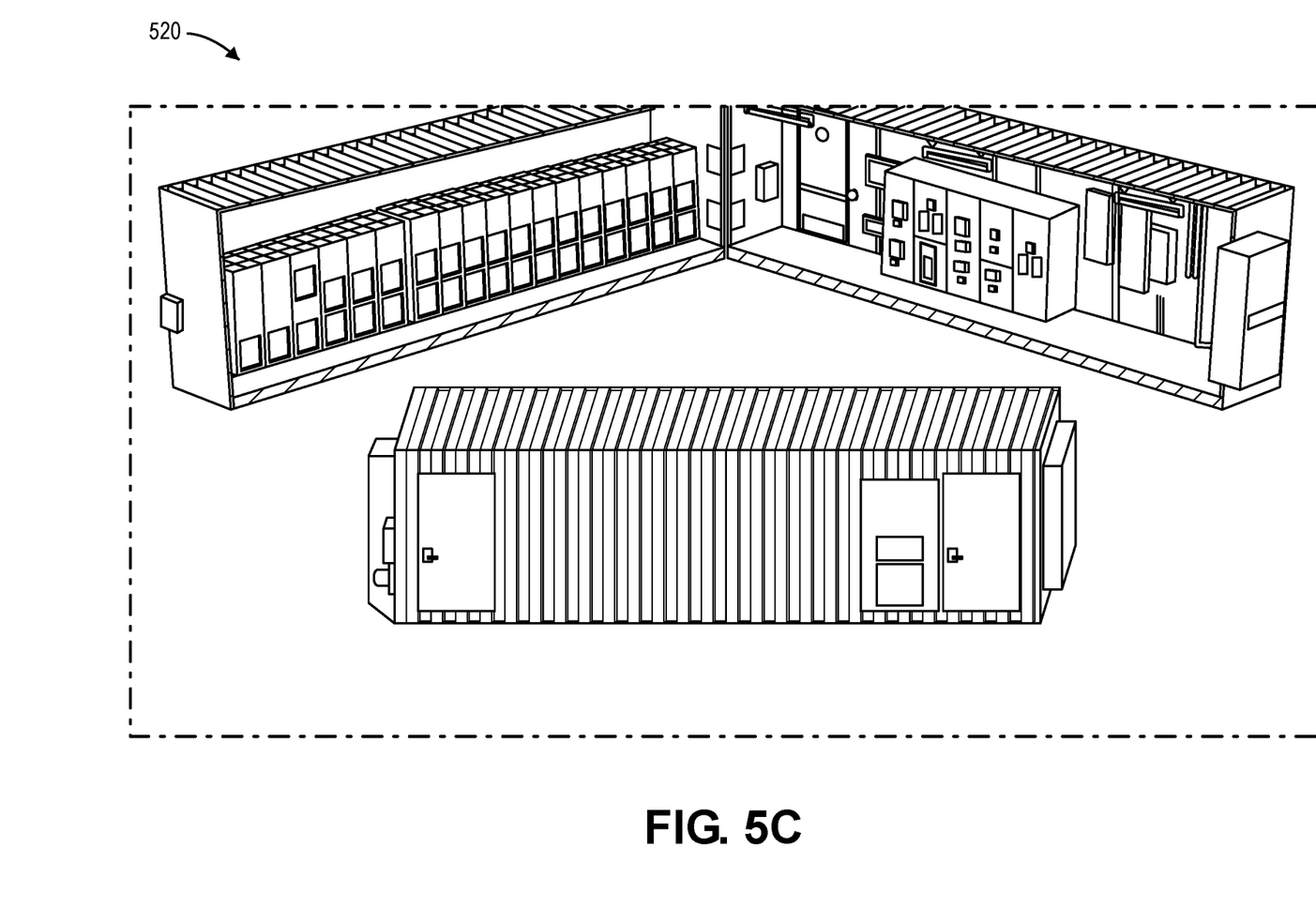
FIG. 5C is a perspective view illustrating an archival data storage system embodied as a shipping container, according to an embodiment.

Implementing an archival data storage system or library configured and operating similarly to storage system 300 into different form factors is specifically contemplated, such as implementation in systems in enclosures configured as illustrated in reference to FIGS. 5A-5C.

Method for Operating an Archival Data Storage Library

Figure 4:
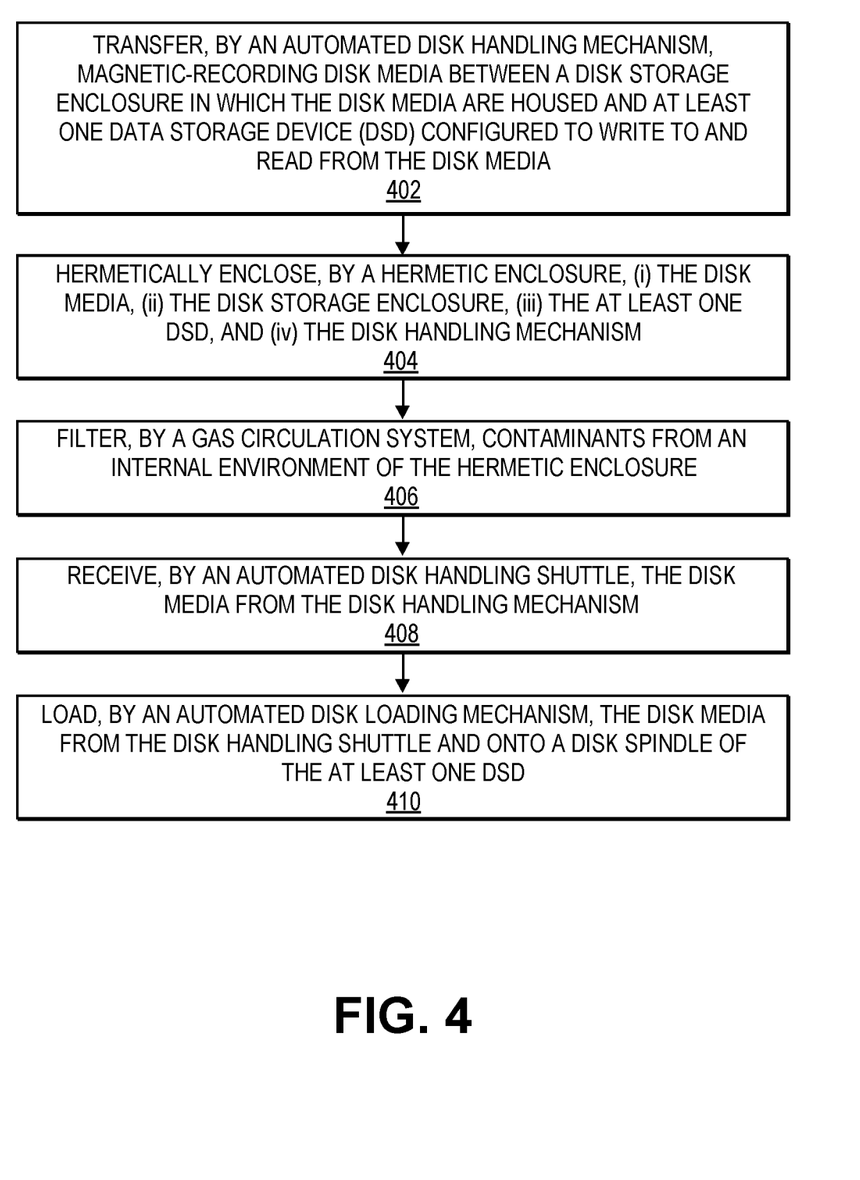
FIG. 4 is a flow diagram illustrating a method for operating a data archival library, according to an embodiment.

FIG. 4 is a flow diagram illustrating a method for operating an archival data storage library, according to an embodiment. Example uses include operating the rack-mountable data storage system 200 of FIG. 2 and/or the cleanroom data storage system 300 of FIGS. 3A-3B, as well as similar storage systems configured and implemented as illustrated in reference to FIGS. 5A-5C.

At block 402, an automated disk handling mechanism transfers magnetic-recording disk media between a disk storage enclosure, in which the disk media are housed, and at least one data storage device (DSD) that is configured to write to and to read from the disk media. For example, automated disk handling mechanism 208 (FIG. 2), 308 (FIGS. 3A-3B) transfers magnetic-recording disk media 202 (FIG. 2), 302 (FIGS. 3A-3B) between a disk storage enclosure 204 (FIG. 2), 304 (FIGS. 3A-3B), in which the disk media 202, 302 are housed, and at least one data storage device (DSD) 206 (FIG. 2), 306 (FIGS. 3A-3B) that is configured to write to and to read from the disk media 202, 302.

At block 404, a hermetic enclosure hermetically encloses (i) the disk media, (ii) the disk storage enclosure, (iii) the at least one DSD, and (iv) the disk handling mechanism. For example, a hermetic enclosure 210 (FIG. 2), 310 (FIGS. 3A-3B) hermetically encloses (i) the disk media 202, 302, (ii) the disk storage enclosure 204, 304, (iii) the at least one DSD 206, 306, and (iv) the disk handling mechanism 208, 308.

At block 406, a gas circulation system filters contaminants from an internal environment of the hermetic enclosure. For example, gas circulation system 312 (FIG. 3B) filters contaminants from an internal environment of the hermetic enclosure 210, 310.

At block 408, an automated disk handling shuttle receives the disk media from the disk handling mechanism. For example, disk handling shuttle 314 (FIGS. 3A-3B) receives the disk media 202, 302 from the disk handling mechanism 208, 308. With data storage system 200 (FIG. 2), such a disk handling shuttle may be foregone in view of the small form factor and physical architecture of storage system 200 and to maintain simplicity of design, cost minimization, and the like.

At block 410, an automated disk loading mechanism loads the disk media from the disk handling shuttle and onto a disk spindle of the at least one DSD. For example, disk loading mechanism 316 (FIGS. 3A-3B) loads the disk media 202, 302 from the disk handling shuttle 314 and onto a disk spindle 124 (FIG. 3A) of the at least one DSD 306. With data storage system 200, disk handling mechanism 208 may further serve a similar function as the disk loading mechanism 316 of storage system 300 (FIGS. 3A-3B), in view of the small form factor and physical architecture of storage system 200 and to maintain simplicity of design, cost minimization, and the like. Hence, a head slider (e.g., head slider of FIG. 1) housing a read-write transducer (e.g., magnetic read-write head 110a of FIG. 1) is positioned to engage with the disk media 302 and, along with an actuator (e.g., VCM of FIG. 1), are configured for and are operable to move the head slider to access portions of the disk media 302 for reading from and/or writing to the disk media 302.

While a relatively small and simple rack-mountable data storage system 200 is described in reference to FIG. 2, and a relatively large and complex cleanroom data storage system 300 is described in reference to FIGS. 3A-3B, implementation of an archival data storage system or library configured and operating similarly to those foregoing storage systems into intermediate form factors is specifically contemplated, as follows. FIG. 5A is a perspective view generally illustrating an archival data storage system 500 embodied as and/or implemented in an equipment rack, according to an embodiment. For example, multiple hermetically-sealed data storage system trays (e.g., storage system 200) may be housed therein, whereby each tray may be placed or slid into a corresponding slot within the rack, or the larger equipment rack itself may be hermetically-sealed. FIG. 5B is a perspective view generally illustrating an archival data storage system 510 embodied as and/or implemented in a group of operationally-integrated equipment racks, according to an embodiment. For example, multiple hermetically-sealed equipment racks (e.g., storage system 510) may be configured to operate integrally as a storage library. FIG. 5C is a perspective view generally illustrating an archival data storage system 520 embodied as and/or implemented generally in the form of a mobile shipping container or intermodal container, according to an embodiment. Here, a hinged clamshell-type container is illustrated. However, in the context of each of the foregoing intermediate form factors corresponding to the archival data storage systems 500, 510, 520, overall configurations may vary from implementation to implementation while maintaining the storage library functionality described herein.

In an implementation in which the hermetic enclosure 310 (FIGS. 3A-3B) is implemented as a cleanroom, or as or within a shipping container 520 (FIG. 5C), according to an embodiment the corresponding storage system (e.g., storage system 300) further comprises a seismic base isolation system supporting the hermetic enclosure (e.g., hermetic enclosure 310). For example, the hermetic enclosure superstructure may be structurally decoupled or "isolated" from a substructure or base on which it is mounted through the use of nonlinear springs, bearings, sliders, and the like between the superstructure and the substructure, thereby allowing the superstructure to slide in a given direction to protect the structural integrity in the event of a seismic event.

Physical Description of an Illustrative Operating Context

Embodiments may be implemented to use digital data storage devices (DSDs) such as hard disk drive (HDDs). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system comprising:
a plurality of magnetic-recording disk media;
at least one disk storage enclosure in which the disk media are housed;
at least one data storage device (DSD) configured to write to and read from the disk media;
at least one automated disk handling mechanism configured to transfer at least some of the disk media between the disk storage enclosure and the at least one DSD;
a hermetic enclosure containing the disk media, the at least one disk storage enclosure, the at least one DSD, and the at least one disk handling mechanism;
an automated disk handling shuttle configured to receive the disk media from the disk handling mechanism; and
an automated disk loading mechanism to access the disk media from the disk handling shuttle and to install the disk media into the at least one DSD.

2. The data storage system of claim 1, further comprising:
a gas circulation system configured to filter contaminants from the internal environment of the hermetic enclosure.

3. The data storage system of claim 1, wherein:
the disk storage enclosure comprises a container comprising a lid configured to open and close; and
the at least one automated disk handling mechanism is configured to open and close the lid of the container.

4. The data storage system of claim 1, wherein the hermetic enclosure is configured as a cleanroom.

5. The data storage system of claim 1,
wherein:
the hermetic enclosure is configured as a cleanroom; and
each of a plurality of the disk handling mechanisms is configured to move between rows of a plurality of disk storage enclosures;
the data storage system further comprising:
wherein:
the automated disk handling shuttle is configured to move across the rows and to receive the disk media from the disk handling mechanisms; and
the automated disk loading mechanism is configured to access the disk media from the disk handling shuttle and to install the disk media into one or more of a plurality of DSDs.

6. The data storage system of claim 5, wherein:
the plurality of disk storage enclosures are configured as disk cassettes configured to store a plurality of the disk media; and
each of the plurality of disk handling mechanisms is configured to move between rows of shelves each housing a plurality of the disk cassettes;
the automated disk handling shuttle is configured to move across the rows of shelves and to receive one or more of the disk cassettes from the disk handling mechanisms; and
the automated disk loading mechanism is configured to access the disk media from the disk cassettes on the disk handling shuttle and to install the disk media into one or more of the plurality of DSDs.

7. The data storage system of claim 1, wherein the hermetic enclosure is configured as a cleanroom, the data storage system further comprising:
at least one first service door positioned adjacent to and configured for use in replacing at least one DSD; and
at least one second service door configured for use in adding or removing disk media from the data storage system.

8. The data storage system of claim 1, wherein the at least one DSD comprises:
a DSD enclosure comprising an opening/closing mechanism; and
a seal configured for temporarily sealing the DSD enclosure during operation.

9. The data storage system of claim 1, further comprising:
one or more access means for accessing the hermetic enclosure.

10. The data storage system of claim 9, wherein the access means are configured for a person entering and exiting the hermetic enclosure.

11. The data storage system of claim 9, wherein the access means comprise a mechanism configured for inhibiting the introduction of external particles into the hermetic enclosure.

12. The data storage system of claim 1, further comprising:
a seismic isolation system supporting the hermetic enclosure.

13. The data storage system of claim 1, wherein the at least one DSD comprises:
a spindle on which to rotatably mount the disk media;
a head slider housing a read-write transducer configured to read from and to write to the disk media; and
an actuator configured to move the head slider to access portions of the disk media.

14. The data storage system of claim 1, wherein the hermetic enclosure is configured as a rack-mountable enclosure.

15. The data storage system of claim 1, wherein the hermetic enclosure is configured as an equipment rack.

16. The data storage system of claim 1, wherein the hermetic enclosure is configured as a group of operationally-integrated equipment racks.

17. The data storage system of claim 1, wherein the hermetic enclosure is configured as a shipping container.

18. A method for operating an archival data storage library, the method comprising:
transferring, by an automated disk handling mechanism, magnetic-recording disk media between a disk storage enclosure in which the disk media are housed and at least one data storage device (DSD) configured to write to and read from the disk media;
hermetically enclosing, by a hermetic enclosure, the disk media, the disk storage enclosure, the at least one DSD, and the disk handling mechanism;
filtering, by a gas circulation system, contaminants from an internal environment of the hermetic enclosure;
receiving, by an automated disk handling shuttle, the disk media from the disk handling mechanism; and
loading, by an automated disk loading mechanism, the disk media from the disk handling shuttle and onto a disk spindle of the at least one DSD.

19. The method of claim 18, further comprising:
engaging, with the disk media, a head slider housing a read-write transducer and an actuator configured to move the head slider to access portions of the disk media; and
reading, by the read-write transducer driven by the actuator, from the disk media.

20. A data storage system comprising:
a plurality of magnetic-recording disk media;
at least one disk storage enclosure in which the disk media are housed, the disk storage enclosure comprising a container comprising a lid configured to open and close;
at least one data storage device (DSD) configured to write to and read from the disk media;
at least one automated disk handling mechanism configured to open and close the lid of the container and to transfer at least some of the disk media between the disk storage enclosure and the at least one DSD; and
a hermetic enclosure containing the disk media, the at least one disk storage enclosure, the at least one DSD, and the at least one disk handling mechanism.

* * * * *